(12) United States Patent
Evans et al.

(10) Patent No.: US 12,467,407 B2
(45) Date of Patent: Nov. 11, 2025

(54) STACKED CRYOGENIC BOTTOMING CYCLES

(71) Applicant: RTX CORPORATION, Farmington, CT (US)

(72) Inventors: Brandon M. Evans, San Antonio, TX (US); Neil J. Terwilliger, Cheshire, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/771,038

(22) Filed: Jul. 12, 2024

(65) Prior Publication Data

US 2024/0359814 A1 Oct. 31, 2024

Related U.S. Application Data

(63) Continuation-in-part of application No. 17/871,270, filed on Jul. 22, 2022.

(51) Int. Cl.

| | |
|---|---|
| *F02C 6/18* | (2006.01) |
| *B64D 37/30* | (2006.01) |
| *F01K 23/10* | (2006.01) |
| *F02C 1/10* | (2006.01) |
| *F02C 7/22* | (2006.01) |
| *F02C 7/224* | (2006.01) |

(52) U.S. Cl.
CPC ............... *F02C 6/18* (2013.01); *B64D 37/30* (2013.01); *F01K 23/10* (2013.01); *F02C 1/10* (2013.01); *F02C 7/22* (2013.01); *F02C 7/224* (2013.01); *F05D 2260/213* (2013.01)

(58) Field of Classification Search
CPC .......... F01K 23/10; F01K 23/08; F02C 7/224; F02C 7/141; F02C 7/32; F02C 6/18; F02C 1/007; F02C 1/10; F05D 2260/10; F05D 2260/213; F05D 2260/232
See application file for complete search history.

(56) References Cited

U.S. PATENT DOCUMENTS

| | | | |
|---|---|---|---|
| 10,830,123 B2 | 11/2020 | Homison et al. | |
| 10,851,704 B2 | 12/2020 | Homison et al. | |
| 11,970,970 B2 | 4/2024 | Macdonald et al. | |
| 2007/0163261 A1* | 7/2007 | Strathman | F03G 6/00 60/659 |
| 2011/0113780 A1* | 5/2011 | Lehar | F02C 1/10 60/671 |
| 2011/0200158 A1* | 8/2011 | Hyde | G21D 3/001 376/322 |
| 2013/0104546 A1* | 5/2013 | Goswami | F01K 25/08 60/641.8 |
| 2013/0318965 A1* | 12/2013 | Ekanayake | F02C 1/007 60/273 |
| 2019/0195131 A1* | 6/2019 | Zia | F02B 37/10 |
| 2019/0249599 A1* | 8/2019 | Sen | F02C 3/04 |
| 2020/0292217 A1* | 9/2020 | Wagner | F25B 11/02 |

(Continued)

*Primary Examiner* — Lindsay M Low
*Assistant Examiner* — Henry Ng
(74) *Attorney, Agent, or Firm* — Carlson, Gaskey & Olds, P.C.

(57) ABSTRACT

An aircraft propulsion system includes a core engine, a first bottoming cycle and a second bottoming cycle that utilize different working fluids having different critical temperatures such that each of the bottoming cycles have different heat absorption capabilities.

20 Claims, 4 Drawing Sheets

(56) References Cited

U.S. PATENT DOCUMENTS

| 2021/0199025 A1* | 7/2021 | Prabhudharwadkar ..................... F01D 25/12 |
| 2021/0301720 A1* | 9/2021 | Staubach ................ F02C 1/007 |
| 2024/0026824 A1 | 1/2024 | Terwilliger et al. |

* cited by examiner

STACKED CRYOGENIC BOTTOMING CYCLES

CROSS REFERENCE TO RELATED APPLICATION

This application is a continuation-in-part of U.S. application Ser. No. 17/871,270 filed on Jul. 22, 2022. The disclosures of U.S. application Ser. No. 17/871,270 are incorporated by reference in its entirety in this application.

TECHNICAL FIELD

The present disclosure relates generally to a bottom cycle for an aircraft propulsion system and more specifically to a system including two bottoming cycles with different working fluids having different heat absorption capacities.

BACKGROUND OF THE INVENTION

Gas turbine engines typically include a compressor where inlet air is compressed and delivered into a combustor. In the combustor, the compressed air is mixed with fuel and ignited to generate an exhaust gas flow. The exhaust flow is expanded through a turbine section to generate shaft power used to drive the compressor and a propulsive fan. Some energy in the high energy exhaust flow is recovered as it is expanded through a turbine section. However, a large amount of energy in the form of heat is simply exhausted from the turbine section to the atmosphere. A bottoming cycle utilizes recovered heat to generate additional useful work. A working fluid in the bottoming cycle is heated to drive a secondary turbine to generate additional shaft power. The working fluid in the bottoming cycle is then cooled, compressed, and reheated before expansion back through the turbine. The capability of the working fluid to accept heat limits energy recovery of the bottoming cycle.

SUMMARY OF THE INVENTION

An aircraft propulsion system according to an exemplary embodiment of this disclosure, among other possible things includes a core engine that includes a compressor that pressurizes an inlet flow that is mixed with a cryogenic fuel and ignited in a combustor to generate an exhaust gas flow that is expanded through a turbine to generate shaft power and a propulsive fan driven by the turbine, a first bottoming cycle with a first working fluid that is circulated within a first closed circuit that includes a first bottoming compressor and a first bottoming turbine, a second bottoming cycle with a second working fluid that is circulated within a second closed circuit that includes a second bottoming compressor and a second bottoming turbine, the first working fluid and the second working fluid are different, a main heat exchanger system for communicating thermal energy into the working fluid of each of the first bottoming cycle and the second bottoming cycle, and a fuel system that includes a cryogenic fuel storage tank and a fuel flow path for routing the cryogenic fuel to the core engine, a first fuel/working fluid heat exchanger where the first working fluid is in thermal communication with the cryogenic fuel, and a second fuel/working fluid heat exchanger where the second working fluid is in thermal communication with the cryogenic fuel.

In a further embodiment of the foregoing aircraft propulsion systems, the first working fluid includes a first liquid-vapor critical point and the second working fluid includes a second liquid-vapor critical point different from the first liquid-vapor critical point.

In a further embodiment of any of the foregoing aircraft propulsion systems, the first working fluid includes a first volume and the second working fluid includes a second volume different than the first volume.

In a further embodiment of any of the foregoing aircraft propulsion systems, one of the first working fluid and the second working fluid includes supercritical nitrogen.

In a further embodiment of any of the foregoing aircraft propulsion systems, one of the first working fluid and the second working fluid includes supercritical carbon dioxide.

In a further embodiment of any of the foregoing, the aircraft propulsion system includes a fuel bypass passage where the cryogenic fuel is routed around one of the first fuel/working fluid heat exchanger and the second fuel/working fluid heat exchanger.

In a further embodiment of any of the foregoing, the aircraft propulsion system further includes a bypass flow heat exchanger where a bypass flow from the compressor of the core engine cools the working fluid.

In a further embodiment of any of the foregoing aircraft propulsion systems, the main heat exchanger system includes a first main heat exchanger that is configured to heat the first working fluid of the first bottoming cycle and a second main heat exchanger that is configured to heat the second working fluid of the second bottoming cycle.

In a further embodiment of any of the foregoing aircraft propulsion systems, the first main heat exchanger includes a first thermal transfer capacity and the second main heat exchanger includes a second thermal transfer capacity different from the first thermal transfer capacity.

In a further embodiment of any of the foregoing, the aircraft propulsion system further includes at least one additional bottoming cycle.

A bottoming cycle system for an aircraft propulsion system according to another exemplary embodiment of this disclosure, among other possible things includes a first bottoming cycle with a first working fluid that is circulated within a first closed circuit that includes a first bottoming compressor and a first bottoming turbine, a second bottoming cycle with a second working fluid that is circulated within a second closed circuit that includes a second bottoming compressor and a second bottoming turbine, the first working fluid and the second working fluid are different, a main heat exchanger system for communicating thermal energy into the first working fluid and the second working fluid, and a fuel system that includes a cryogenic fuel storage tank and a fuel flow path for routing a cryogenic fuel, a first fuel/working fluid heat exchanger where the first working fluid is in thermal communication with the cryogenic fuel, and a second fuel/working fluid heat exchanger where the second working fluid is in thermal communication with the cryogenic fuel.

In a further embodiment of the foregoing bottoming cycle system, the first working fluid includes a first liquid-vapor critical point and the second working fluid includes a second liquid-vapor critical point different from the first liquid-vapor critical point.

In a further embodiment of any of the foregoing bottoming cycle systems, the first working fluid includes a first volume and the second working fluid includes a second volume different than the first volume.

In a further embodiment of any of the foregoing bottoming cycle systems, the first working fluid includes supercritical nitrogen and the second working fluid includes supercritical carbon dioxide.

In a further embodiment of any of the foregoing, the bottoming cycle system includes a fuel bypass passage where the cryogenic fuel is routed around one of the first fuel/working fluid heat exchanger and the second fuel fuel/working fluid heat exchanger.

In a further embodiment of any of the foregoing, the bottoming cycle system further includes a bypass flow heat exchanger where a bypass flow from a compressor of a core engine cools the working fluid.

A method of assembling an aircraft propulsion system according to another exemplary embodiment of this disclosure, among other possible things includes configuring a first bottoming cycle with a first working fluid that is circulated within a first closed circuit that includes a first bottoming compressor and a first bottoming turbine, configuring a second bottoming cycle with a second working fluid that is circulated within a second closed circuit that includes a second bottoming compressor and a second bottoming turbine, the first working fluid and the second working fluid are different, configuring a main heat exchanger system for communicating thermal energy into the working fluid of each of the first bottoming cycle and the second bottoming cycle, configuring a fuel system that includes a cryogenic fuel storage tank and a fuel flow path for routing a cryogenic fuel, configuring a first fuel/working fluid heat exchanger where the first working fluid is in thermal communication with the cryogenic fuel, and configuring a second fuel/working fluid heat exchanger where the second working fluid is in thermal communication with the cryogenic fuel.

In a further embodiment of the foregoing, the method further includes configuring the first working fluid to include a first liquid-vapor critical point and the second working fluid to include a second liquid-vapor critical point different from the first liquid-vapor critical point.

In a further embodiment of any of the foregoing, the method further includes configuring the first working fluid to include a first volume and the second working fluid to include a second volume different than the first volume.

In a further embodiment of any of the foregoing, the method further includes the main heat exchanger system to include at least two heat exchangers of different thermal transfer capacities.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

U.S. application Ser. No. 17/871,270 is incorporated herein, by reference in its entirety.

Figure 1:
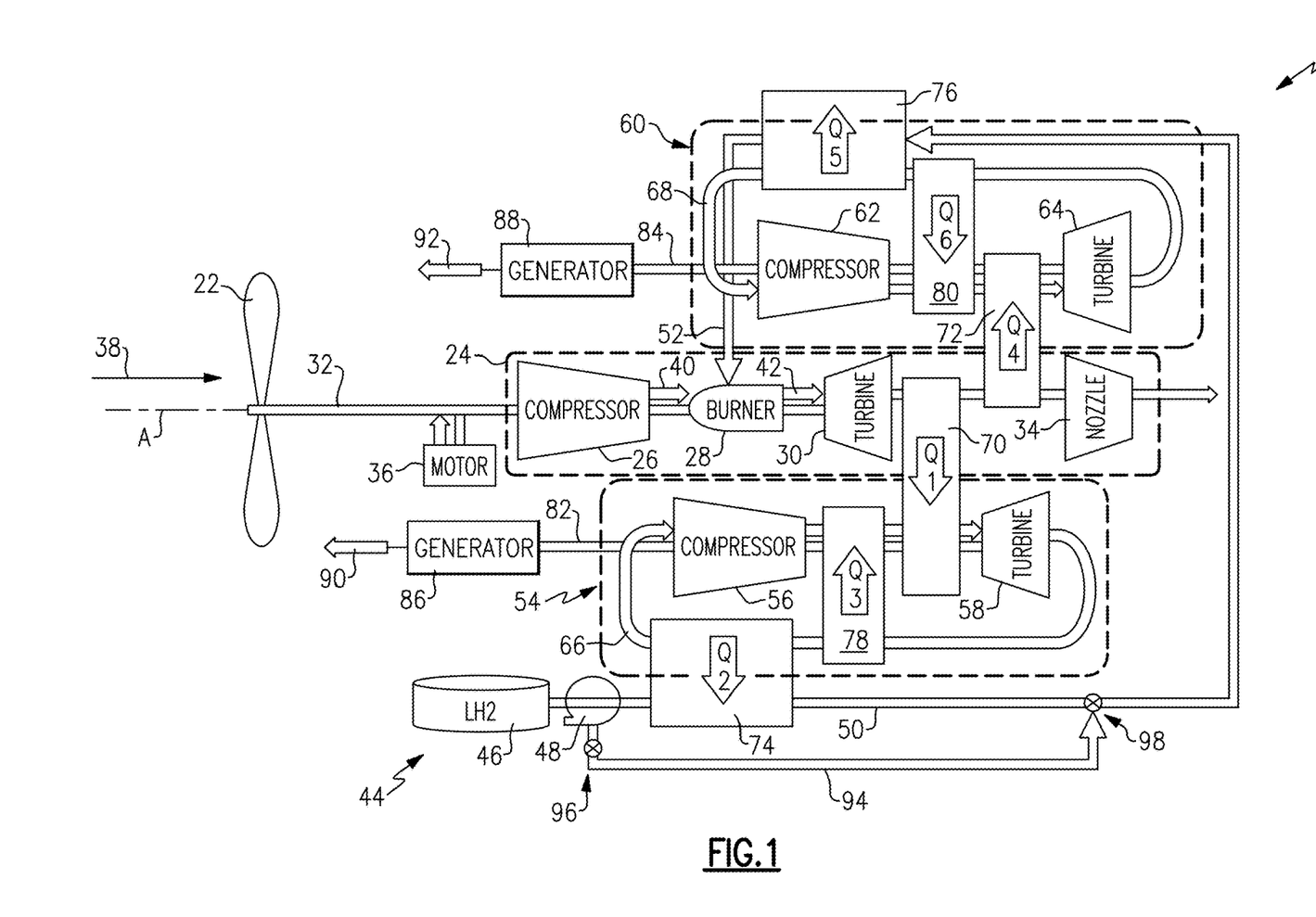
FIG. 1 is a schematic view of an example aircraft propulsion system including two bottoming cycles.

FIG. 1 schematically illustrates an aircraft propulsion system 20 that includes a core engine 24 and a bottoming cycle system. The example bottoming cycle system includes a first bottoming cycle 54 and a second bottoming cycle 60 that utilize different working fluids such that each of the bottoming cycles 54, 60 have different heat absorption capabilities due to the working fluids having different critical temperatures.

One of the bottoming cycles 54, 60 uses a working fluid with a lower critical temperature than the other bottoming cycle, such as to take advantage of the entire range of cryogenic fuel heat absorption capability. The more thermal energy that can be input into each of the bottoming cycles, the more energy that can be recovered for use in the aircraft propulsion system. However, the cryogenic fuel utilized as a heat sink for the bottoming cycles has a limited capacity for heat rejection. Moreover, in some instances, depending on which working fluid is being utilized, the working fluid may also have a reduced capability for absorbing heat. Accordingly, the example propulsion system utilizes bottoming cycles of different heat absorption capabilities to take advantage of more of the heat absorption capability provided by the cryogenic fuel cold sink.

The example propulsion system 20 includes the core engine 24 with a compressor 26, combustor 28 and turbine 30. Inlet airflow 38 is compressed in the compressor 26 to generate a compressed core flow 40 that is mixed with a cryogenic fuel flow 52 in the combustor 28 to generate an exhaust gas flow 42. The exhaust gas flow 42 expands through the turbine section 30 to generate shaft power to drive an engine shaft 32 that may be utilized to drive the compressor 26 and a propulsive fan 22. The exhaust gas flow from the turbine 30 is exhausted through an exhaust nozzle 34. In one example embodiment, an electric motor 36 may be coupled to the engine shaft 32 to supplement power provided by the turbine 30. Exhaust gas flow 42 is exhausted through the nozzle 34 to the ambient environment after the communication of thermal energy into the working fluids of the bottoming cycles.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

The first bottoming cycle 54 includes a bottoming compressor 56 that is coupled to a bottoming turbine 58 through a bottoming shaft 82. A first working fluid 66 circulates within a closed circuit between the bottoming compressor 56 and the bottoming turbine 58. The compressor 56 pressurizes the working fluid 66 that is then heated and expanded through the bottoming turbine 58 to generate shaft power. In one example embodiment, the bottoming shaft 82 is coupled to drive a generator 86 to produce electric power 90. The electric power 90 is derived from the recovery of thermal energy and may be used for engine or aircraft accessory systems. Moreover, the electric power 90 may be used to drive the electric motor 36 coupled to the engine shaft 32.

A second bottoming cycle 60 includes a second bottoming compressor 62 that is coupled to a second bottoming turbine 64 through a second bottoming shaft 84. The bottoming turbine 64 drives the second bottoming shaft 84 to drive a second generator 88 and produce electric power 92. A second working fluid 68 within the second bottoming cycle 60 is different from the working fluid 66 within the first bottoming cycle 54.

Thermal energy from the core engine 24 is transferred into each of the bottoming cycles through a main heat exchanger system. The main heat exchanger system includes a first main heat exchanger 70 and a second main heat exchanger 80. The first main heat exchanger 70 exchanges heat between the exhaust gas flow 42 produced in the core engine 24 and the first working fluid 66 within the first bottoming cycle 54. The second main heat exchanger 72 communicates thermal energy from the exhaust gas flow 42 into the second working fluid 68 of the second bottoming cycle 60.

A fuel system 44 utilizes a cryogenic fuel that is maintained at extremely low temperatures. The example fuel system 44 includes a liquid hydrogen fuel storage tank 46, a fuel pump 48 that generates a liquid fuel flow 50. The liquid fuel flow 50 is utilized as a heat sink to absorb heat from each of the bottoming cycles 54, 60. A first fuel/working fluid heat exchanger 74 is in communication with the first working fluid 66 in the first bottoming cycle 54. A second fuel working fluid heat exchanger 76 is in fluid communication with the second working fluid 68 in the second bottoming cycle 60.

The cryogenic fuel system 44 is configured to provide a hydrogen based fuel such as a liquid hydrogen ($LH_2$). Although hydrogen is disclosed by way of example, other cryogenic, non-carbon based fuels could be utilized and are within the contemplation of this disclosure.

The fuel tank 46 includes features for storing a cryogenic fuel at temperatures required to maintain the fuel in a liquid phase. Temperatures required to maintain the cryogenic fuel in a liquid phase may be as low as about −412° F. In one example embodiment, the cryogenic fuel is maintained at a temperature below 0° F. In another example embodiment, the fuel is maintained in the tank 46 at temperatures below −100° F. The cryogenic fuel may be maintained at temperatures below about −150° F. and as low as about −435° F.

Each of the first bottoming cycle 54 and the second bottoming cycle 60 include a recuperative heat exchanger 78, 80. Each of the recuperative heat exchangers 78, 80 provide for the communication of thermal energy between the working fluid within each of the respective bottoming cycles 54, 60. Thermal energy from a hotter portion of the working fluid is transferred into cooler portions of the working fluid with the same closed circuit.

Figure 2:
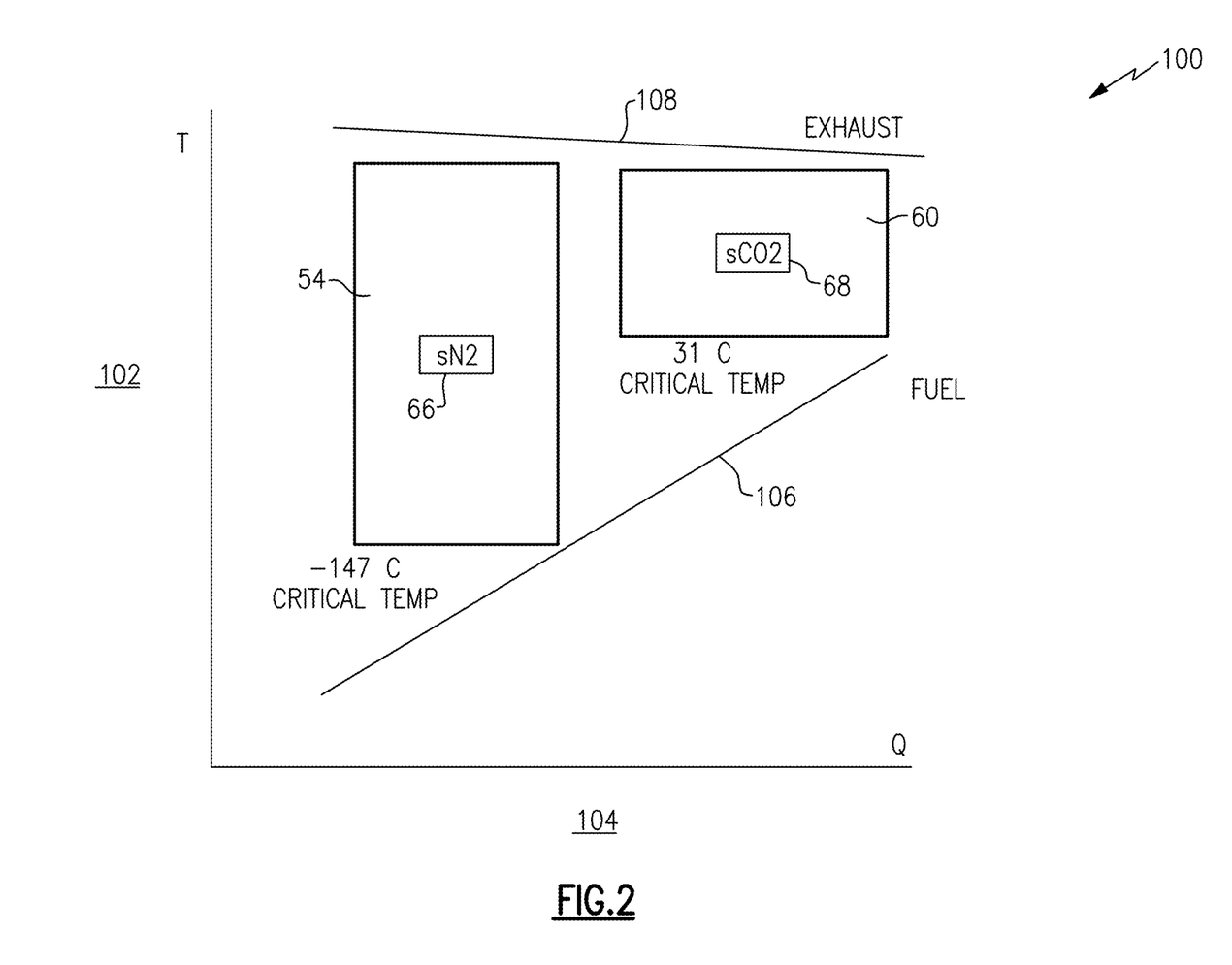
FIG. 2 is a chart illustrating heat absorption capacity of bottoming cycles relative to a heat source and a heat sink.

Referring to FIG. 2 with continued reference to FIG. 1, a graph 100 is shown and schematically illustrates a relationship between temperature 102 and heat 104 with regard to the cryogenic fuel indicated at 106. In one example embodiment, the first working fluid 66 comprises a super critical nitrogen and the second working fluid 68 comprises a super critical carbon dioxide as schematically shown at 68. Although example working fluids with different critical temperatures are disclosed, other working fluids and mixtures could be utilized and tailored to application specific temperature ranges and operation.

Heat input from the exhaust gas flow 108 remains substantially constant during engine operation. However, the amount of heat energy input into the fuel 106 increases and thereby may reach a limit as to how much heat can be captured. The example bottoming cycles 54, 60 that have different capabilities for accepting heat. In one disclosed example embodiment, the second bottoming cycle 60 includes the working fluid 68 that provides for absorption of heat at higher temperatures that correspond with the heat capacity of the fuel after it has accepted heat from the first working fluid 66 of the first bottoming cycle 54.

The example bottoming cycles are tailored to the specific heat absorption capabilities of the cryogenic fuel 50. The first bottoming cycle 54 is tailored to utilize the cryogenic fuel as a heat sink at the lower temperatures and the second bottoming cycle 60 is configured to absorb heat energy from the fuel once it has been heated in the first bottoming cycle 54.

Although example working fluid types are illustrated and disclosed by way of example, other working fluids with other super critical temperatures or other material properties that are conducive to absorbing heat at specific temperatures may be utilized and are within the contemplation and scope of this disclosure. Additionally, the amount of working fluid and size of each of the first bottoming cycle 54 and second bottoming cycle 60 may be adjusted to also provide different levels of heat absorption capabilities between the first and second bottoming cycles.

The example propulsion system 20 includes a bypass passage 94 for the fuel flow 50. The bypass 94 is operable by first and second valves 96, 98 and provide the ability for the cryogenic fuel flow 50 to be routed around the first fuel/working fluid heat exchanger 74. Bypassing the first fuel/working fluid heat exchanger 74 provides for operation of the first and second bottoming cycles 54, 60 to be adjusted to accommodate current operating conditions and the limits of the cold sink provided by the cryogenic fuel.

Figure 3:
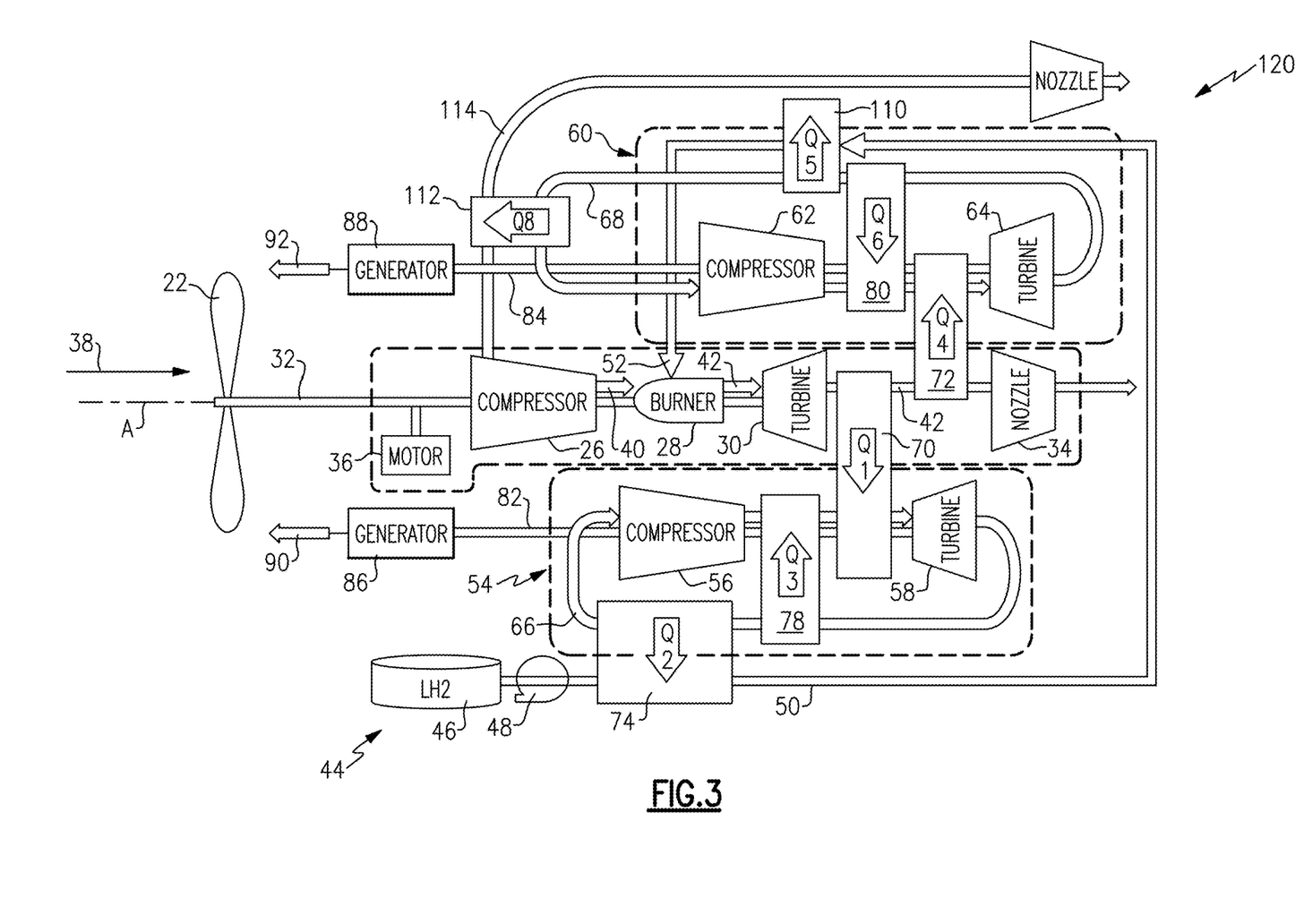
FIG. 3 is a schematic view of another example aircraft propulsion system including two bottoming cycles.

Referring to FIG. 3 with continued reference to FIG. 2, another example aircraft propulsion system 120 is illustrated and includes the first bottoming cycle 54 and the second bottoming cycle 60 as previously described with regard to FIG. 1. The aircraft propulsion system embodiment 120 includes a first fuel/air heat exchanger 110 and a bypass flow heat exchanger 112.

The heat exchanger 110 in the second bottoming cycle 60 provides additional heat input to vaporize the liquid fuel flow 50 prior to injection into the combustor 28. The bypass flow heat exchanger 112 utilizes a bypass flow 114 from the compressor section 26 of the core engine 24 to cool the working fluid flow. Cooling of the working fluid flow provides for additional waste heat recovery by the working fluid flow 68. The example second bottoming cycle 60 provides for additional waste heat recovery with the extra cooling capacity provided by the cooling with the disclosed bypass flow 114 or other cooling airflows from either the propulsor or the compressor section 26.

Figure 4:
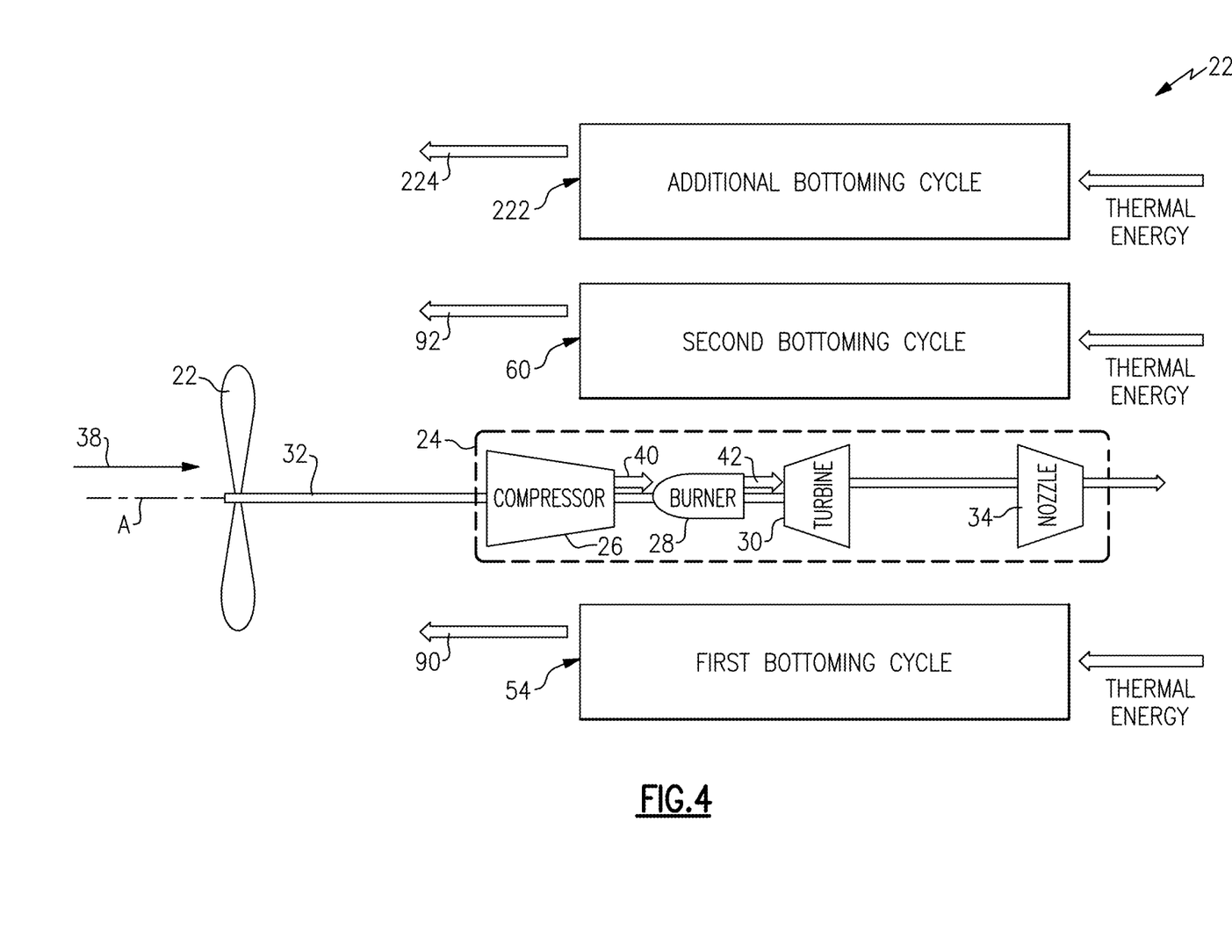
FIG. 4 is a schematic view of yet another example aircraft propulsion system including a first bottoming cycle, a second bottoming cycle and at least one additional bottoming cycle.

Referring to FIG. 4, another example propulsion system is 220 is illustrated and includes the first bottoming cycle 54, the second bottoming cycle 60, and an additional bottoming cycle 222. The first bottoming cycle 54 and the second bottoming cycle 60 are illustrated schematically and are as described in the previous disclosed examples. The first bottoming cycle 54, the second bottoming cycle 60 and the additional bottoming cycle 222 produce power from thermal energy recovered from the core engine 24. In the disclosed example, electric power 90, 92 and 224 is generated by respective ones of the first bottoming cycle 54, the second bottoming cycle 60, and the additional bottoming cycle 222. The example propulsion system 220 illustrates that the example propulsion system 220 may include at least one additional bottoming cycle 220 to further enable tailoring of operation to improve cycle efficiency.

Although additional heat exchangers 110 and 112 are shown by way of example, other heat exchanger, and/or combinations of heat exchangers may be included to further provide for exchange of thermal energy from other systems to maximize heat recovery.

Utilizing bottoming cycles of different capabilities to cascade the heat acceptance capabilities of the cryogenic fuel flow 50 increases the total amount of waste heat that can be recovered from the example core engine.

Accordingly, the example propulsion systems include bottoming cycles that leverage the cold sink available from cryogenic fuels and tailor operation to optimize bottoming cycle efficiency.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. An aircraft propulsion system comprising:
a core engine comprising a compressor that pressurizes an inlet flow that is mixed with a cryogenic fuel and ignited in a combustor to generate an exhaust gas flow that is expanded through a turbine to generate shaft power and a propulsive fan driven by the turbine;
a first bottoming cycle with a first working fluid that is circulated within a first closed circuit comprising a first bottoming compressor and a first bottoming turbine;
a second bottoming cycle with a second working fluid that is circulated within a second closed circuit comprising a second bottoming compressor and a second bottoming turbine, wherein the first working fluid and the second working fluid are different;
a main heat exchanger system for communicating thermal energy into the working fluid of each of the first bottoming cycle and the second bottoming cycle; and
a fuel system comprising a cryogenic fuel storage tank and a fuel flow path for routing the cryogenic fuel to the core engine;
a first fuel/working fluid heat exchanger where the first working fluid is in thermal communication with the cryogenic fuel; and
a second fuel/working fluid heat exchanger where the second working fluid is in thermal communication with the cryogenic fuel.

2. The aircraft propulsion system as recited in claim 1, wherein the first working fluid comprises a first liquid-vapor critical point and the second working fluid comprises a second liquid-vapor critical point different from the first liquid-vapor critical point.

3. The aircraft propulsion system as recited in claim 1, wherein the first working fluid comprises a first volume and the second working fluid comprises a second volume different than the first volume.

4. The aircraft propulsion system as recited in claim 1, wherein one of the first working fluid and the second working fluid comprises supercritical nitrogen.

5. The aircraft propulsion system as recited in claim 1, wherein one of the first working fluid and the second working fluid comprises supercritical carbon dioxide.

6. The aircraft propulsion system as recited in claim 1, including a fuel bypass passage where the cryogenic fuel is routed around one of the first fuel/working fluid heat exchanger and the second fuel/working fluid heat exchanger.

7. The aircraft propulsion system as recited in claim 1, further comprising a bypass flow heat exchanger where a bypass flow from the compressor of the core engine cools the second working fluid.

8. The aircraft propulsion system as recited in claim 1, wherein the main heat exchanger system comprises a first main heat exchanger configured to heat the first working fluid of the first bottoming cycle and a second main heat exchanger configured to heat the second working fluid of the second bottoming cycle.

9. The aircraft propulsion system as recited in claim 8, wherein the first main heat exchanger comprises a first thermal transfer capacity and the second main heat exchanger comprises a second thermal transfer capacity different from the first thermal transfer capacity.

10. The aircraft propulsion system as recited in claim 1, further comprising at least one additional bottoming cycle.

11. A bottoming cycle system for an aircraft propulsion system comprising:
a first bottoming cycle with a first working fluid that is circulated within a first closed circuit comprising a first bottoming compressor and a first bottoming turbine;
a second bottoming cycle with a second working fluid that is circulated within a second closed circuit comprising a second bottoming compressor and a second bottoming turbine, wherein the first working fluid and the second working fluid are different;
a main heat exchanger system for communicating thermal energy into the first working fluid and the second working fluid; and
a fuel system comprising a cryogenic fuel storage tank and a fuel flow path for routing a cryogenic fuel;
a first fuel/working fluid heat exchanger where the first working fluid is in thermal communication with the cryogenic fuel; and
a second fuel/working fluid heat exchanger where the second working fluid is in thermal communication with the cryogenic fuel.

12. The bottoming cycle system as recited in claim 11, wherein the first working fluid comprises a first liquid-vapor critical point and the second working fluid comprises a second liquid-vapor critical point different from the first liquid-vapor critical point.

13. The bottoming cycle system as recited in claim 11, wherein the first working fluid comprises a first volume and the second working fluid comprises a second volume different than the first volume.

14. The bottoming cycle system as recited in claim 11, wherein the first working fluid comprises supercritical nitrogen and the second working fluid comprises supercritical carbon dioxide.

15. The bottoming cycle system as recited in claim 11, including a fuel bypass passage where the cryogenic fuel is routed around one of the first fuel/working fluid heat exchanger and the second fuel fuel/working fluid heat exchanger.

16. The aircraft propulsion system as recited in claim 11, further comprising a bypass flow heat exchanger where a bypass flow from a compressor of a core engine cools the second working fluid.

17. A method of assembling an aircraft propulsion system comprising:

configuring a first bottoming cycle with a first working fluid that is circulated within a first closed circuit comprising a first bottoming compressor and a first bottoming turbine;

configuring a second bottoming cycle with a second working fluid that is circulated within a second closed circuit comprising a second bottoming compressor and a second bottoming turbine, wherein the first working fluid and the second working fluid are different;

configuring a main heat exchanger system for communicating thermal energy into the working fluid of each of the first bottoming cycle and the second bottoming cycle;

configuring a fuel system comprising a cryogenic fuel storage tank and a fuel flow path for routing a cryogenic fuel;

configuring a first fuel/working fluid heat exchanger where the first working fluid is in thermal communication with the cryogenic fuel; and configuring a second fuel/working fluid heat exchanger where the second working fluid is in thermal communication with the cryogenic fuel.

18. The method as recited in claim 17, further comprising configuring the first working fluid to comprise a first liquid-vapor critical point and the second working fluid to comprise a second liquid-vapor critical point different from the first liquid-vapor critical point.

19. The method as recited in claim 17, further comprising configuring the first working fluid to comprise a first volume and the second working fluid to comprise a second volume different than the first volume.

20. The method as recited in claim 17, further comprising the main heat exchanger system to comprise at least two heat exchangers of different thermal transfer capacities.

* * * * *